No. 877,497. PATENTED JAN. 28, 1908.
J. W. GAMBLE.
APPARATUS FOR FEEDING, PURIFYING, AND REGULATING FEED WATER.
APPLICATION FILED OCT. 3, 1906.
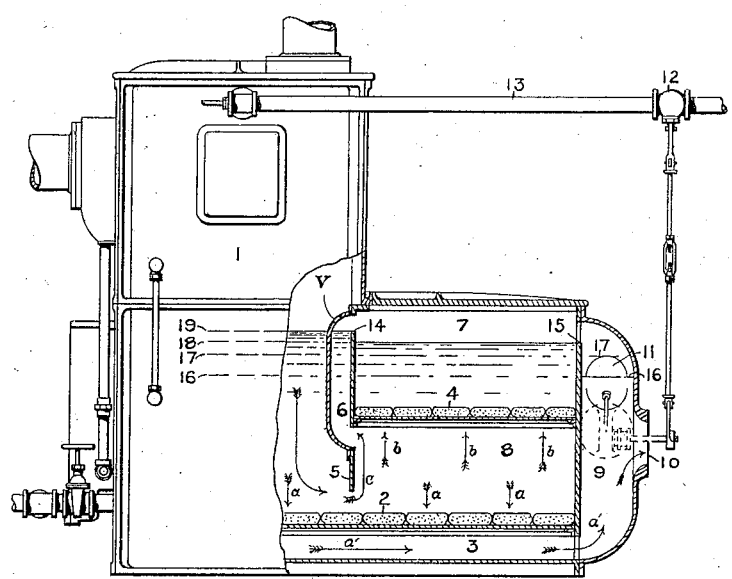
WITNESSES:
INVENTOR
BY
ATTORNEY

UNITED STATES PATENT OFFICE.

JOSEPH WILLARD GAMBLE, OF PHILADELPHIA, PENNSYLVANIA, ASSIGNOR TO JOSEPH S. LOVERING WHARTON, WILLIAM S. HALLOWELL, AND JOHN C. JONES, DOING BUSINESS UNDER THE FIRM NAME OF HARRISON SAFETY BOILER WORKS, OF PHILADELPHIA, PENNSYLVANIA.

APPARATUS FOR FEEDING, PURIFYING, AND REGULATING FEED-WATER.

No. 877,497.  Specification of Letters Patent.  Patented Jan. 28, 1908.

Application filed October 3, 1906. Serial No. 337,224.

*To all whom it may concern:*

Be it known that I, JOSEPH WILLARD GAMBLE, a citizen of the United States, and resident of, and whose post-office address is No. 2602 North Thirtieth street, Philadelphia, in the county of Philadelphia and State of Pennsylvania, have invented certain new and useful Improvements in Apparatus for Feeding, Purifying, and Regulating Feed-Water, of which the following is a specification.

My invention relates to improvements in devices for heating, purifying and regulating a supply of water, and more especially to those instances where chemical solution is supplied to the water which is subsequently heated, filtered and adapted for feeding boilers or for other purposes where a constant supply of purified and heated water is required.

The objects of my invention are especially, first, to provide means for insuring an ample supply of heated and treated water irrespective of the condition of the filtering elements; second, to provide means simple, positive, efficient and automatic in operation; third, to provide means which shall come into operation successively and coöperatively according to the conditions arising and the needs to be satisfied.

Where chemical solution is supplied to feed-water in a heater, there is a consequent precipitation of impurities, which fall to the bottom of the tank and may be removed when necessary. Moreover, the rapidity with which this precipitation is accomplished varies according to the temperature of the water. Where the water is led through the ordinary filter-bed, these impurities finally choke or reduce the effectiveness of the filter. When this occurs, of course the efficient operation of the whole system is seriously affected or is at a standstill, thus rendering inadequate the ultimate supply available for use, and it becomes necessary to secure an increased and sufficient supply of water for the pump or other distributing means even if such supply be not so thoroughly prepared as it would be were there no obstruction and the apparatus operating at its usual capacity and performing its functions in the usual manner and sequence. It is important nevertheless that the necessary increment shall be both heated and so far as possible purified by the chemical treatment even if the precipitation has not been entirely removed by the filter. Therefore, instead of relying upon the original cold-water supply for the increment I take it from the heater and purifier at some point in the circulation before or in front of the filter, and since the lower strata have been given more time for the precipitation and agglomeration of the impurities I prefer to draw on them for my increment. It is obvious, moreover, that this process should be in general automatic and at the same time capable of regulation; also that it should be deferred until absolutely necessary. Because there are certain advantages in leading the water down through the filter-bed from above,—among which are the utilization of the effective head of water in the main body of the heater, and the consequent finer filtration,—and because there are also certain advantages in leading the water up from below through the filter screen,—among which is the fact that the precipitation falls away from the filter-screen rather than onto it, which increases the period of its effectiveness as a filter,— and because by combining both forms of filter-bed and screen, I am also able to secure successive, more perfectly treated and effective increments to the outflow; therefore, I employ both forms of filter and a by-pass about both, one or more of which may be automatically called into operation both coöperatively and succesively as the conditions and needs make necessary.

I accomplish the desired ends by the means described and illustrated in the following description and drawing, and particularly claimed hereinafter.

The figure is an elevation of a combined heater, purifier and filter embodying my invention, showing a portion of the casing broken away and the device within principally in section.

Since the general structure is well known in the art, I do not illustrate those features which are common in these devices and which do not form a particular part of my improvement, and which have already been described in the Patent No. 823,212 issued to me and dated June 12, 1906, and a Patent No. 811,485, dated January 30, 1906.

In the figure, —1— is a heater; 2— a filter bed; 3— an outlet passage; 4— a filter-bed or screen; 5— a partition or deflecting plate; 6— a by-pass; 7— a filtered water chamber; 8— an intermediate chamber; 9— an outlet chamber; 10— the outlet therefrom; 11— cold water feed regulating float; 12— cold water feed regulating valve; 13— cold water feed pipe; 14— lower lip of by-pass outlet into filter-screen chamber; 15— lower lip of passage out of filter-screen chamber into float chamber; 16— normal water line; 17— water line at which float —11— closes valve —12—; 18— water line at which water passes out over —15—; 19— water line at which by-pass —6— begins to operate.

The operation of this device is as follows: The cold water entering through pipe —13— and mixed with the chemical reagent is heated in the well known manner in the heater —1—, and normally is withdrawn through the filter-bed —2— into outlet chamber —3—, and thus out through —9— and —10— to the pumps; this being the line of least resistance. If, however, because of the obstruction or clogging of the filter-bed —2— the resistance increases and a sufficient quantity of water is not available in the outlet —3—, the water line in —9— falls, the valve —12— is opened wide, the level rises to —18— the current is diverted upward through the filter-screen —4— and begins to overflow into —9— over the lip —15—, thus being still thoroughly filtered through the newly operating filter —4—, and the advantage derived from the utilization of the water which has been longest treated is secured, since the partition plate —5— limits the supply to the lower strata, and the supply to the pumps through the chamber —9— is still undiminished. It will be seen that this is a successive step in the operation, coming into action automatically, but only when the normal operation becomes insufficient.

The lower lip —15— of the opening into —9— from filter-screen chamber —7— is lower than the lip —14— of the by-pass —6— so that if sufficient water is passing through the filter-screen —4—, either alone or in addition to that still passing through the filter-bed —2—, then no water will pass through the by-pass, and thus the requirements of the pumps will be filled by sufficiently filtered, as well as heated and otherwise treated, water. If, however, the water passing through both filter-bed —2— and filter-screen —4— is not sufficient for the demand of the feed pump because of the continued clogging or other reason, then since the valve —12— is still open and constantly supplying water to the heater through —13—, the water level in the heater rises still higher to —19— until it overflows through the by-pass —6— and over the lip —14—, thus supplementing the water passing through the filter-bed —2— and filter-screen —4— and assuring a sufficient supply through the feed pump. It is evident, of course, that the water passing through the by-pass is quite unfiltered, although chemically treated. It will be seen that this is another successive step in the operation, also automatic and also occurring only when the preceding stages become insufficient, since it is least effective.

The normal operation is, of course, preferable because of the reasons already given, and it is evident that the steps above described are successive, and that the stage at which the filter-screen —4— is called into operation is, in point of beginning, subsequent to, but in action may be partially simultaneous with, the normal stage in which the water passes through the filter-bed —2—; that is, if the filter-bed —2— is only partially clogged, the necessary increment will at the same time pass through the filter-screen —4—; if the filter-bed —2— is entirely clogged, the entire supply passes through the filter-screen —4— so long as it is clear, but no part will pass through filter-screen —4— or by-pass —6— until the filter-bed —2— becomes so inoperative that the supply reaching the pumps therethrough is insufficient. The same applies to the operation of the by-pass; that is, if the filter-bed —2— is partially clogged, but a portion of the water passes through, and because of the partial clogging of the filter-screen —4— an insufficient increment passes through that filter, then as much as may be necessary to complete the supply will pass through the by-pass —6—, although the latter supply will not be filtered; and as must be clear, if both the filter-bed —2— and filter-screen —4— are entirely clogged, then all the supply will pass through the by-pass —6—, but will be, of course, unfiltered. Thus the operation is successive so far as the beginning of the various steps is concerned, but may be simultaneous so far as the actual performance of the functions of the various elements of the apparatus is concerned; the different stages being also successive as regards the effectiveness of the function of purification. It is also pointed out that the quantity passing through each element varies inversely in general (although not in any fixed ratio) as the quantity passing through that one or those which precede it in operation.

It may be cited as among the advantages of this arrangement that the area of the filter is increased by a large percentage, according to the size of the system; during the normal operation I get the benefit of the fine filtration under the greater head of water; when the filter-screen comes into action in the second step, I get the benefit of the combined effect of both the filter-bed and the filter-screen; and finally if both filter-bed and filter-screen prove inadequate, a sufficient supply is still insured through by-pass.

I do not limit myself to any particular purpose, design or arrangement, or proportion of the parts, as illustrated, but What I do claim and desire to protect by Letters Patent is:

1. The combination of a heater; an outlet chamber; means in said outlet chamber for controlling the feed supply; a plurality of filters and a by-pass intermediate the heater and the outlet chamber, and means for bringing them successively into operation dependent upon the quantity of water in the outlet chamber, substantially as described.

2. The combination of a heater; a filter-bed; an outlet chamber beyond the filter-bed containing means for regulating feed supply dependent upon the water level; a supplementary filter-screen; a passage beyond the same communicating with the outlet chamber, the opening of which is above the normal water line in the outlet chamber, substantially as described.

3. The combination of a heater; a filter-bed; an outlet chamber beyond the filter-bed; a supplementary filter-screen; a passage beyond the same communicating with the outlet chamber, the opening of which is above the normal water line in the outlet chamber; and a by-pass intermediate the heater and the outlet chamber, substantially as described.

4. The combination of a heater; a filter-bed; an outlet chamber beyond the filter-bed; supplementary filter screen; a passage beyond the same communicating with the outlet chamber, the opening of which is above the normal water line in the outlet chamber, and a by-pass about the filter-bed and filter-screen opening above the opening of the passage beyond the filter-screen, substantially as described.

5. The combination of a heater a filter-bed and an outlet chamber; a passage in the latter opening beneath the filter-bed; a filter-screen above the filter-bed and a passage opening into the outlet chamber above the filter-screen, substantially as described.

6. The combination of a heater a filter-bed and an outlet chamber; a passage in the latter opening beneath the filter-bed; a filter-screen above the filter-bed and a passage opening into the outlet chamber above the filter-screen; a by-pass connecting the heater with the outlet chamber around the filter-bed and filter-screen, and means for causing the water to pass successively through the filter-bed, filter-screen and by-pass into the outlet chamber, substantially as described.

7. The combination of a heater; an outlet chamber; a filter-bed below the heater; a passage beyond the filter-bed opening into the outlet chamber; an intermediate chamber above the filter-bed opening into the heater near the bottom; a filter-screen above the intermediate chamber; a second passage above the filter-screen into the outlet chamber; a by-pass connecting the intermediate chamber with the passage above the filter-screen into the outlet chamber, and having its opening above the level of the opening of the passage into the outlet chamber, substantially as described.

8. The combination of a heater; two filtering elements oppositely disposed with respect to each other; an outlet chamber connecting on opposite sides with the spaces beyond the filtering elements, and a by-pass intermediate the heater and the outlet chamber, and means for successively causing the water to flow through the filter-bed, the filter-screen and the by-pass into the outlet chamber, substantially as described.

9. The combination of a plurality of filtering elements, a by-pass about the same, and means for automatically bringing the various elements successively into operation, substantially as described.

10. The combination of a plurality of filtering elements, a source of supply thereto; an outlet therefrom; a by-pass connecting the inlet and the outlet, and means for automatically bringing the filters and the by-pass successively into operation, substantially as described.

11. The combination of a plurality of filters operating at successive water levels; a by-pass about the filters operating at a water level higher than those operating the filters, substantially as described.

12. The combination of a heater, a plurality of filters and a by-pass about the filters so arranged as to come automatically and successively into operation, substantially as described.

13. A heater, a horizontal filter-bed; an inverted horizontal filter-screen, and means for bringing it into operation subsequent to the filter-bed and dependent upon the insufficiency of the filter-bed; a by-pass intermediate the heater and the outlet, and means for bringing it into operation subsequent to that of both the filter-bed and filter-screen and dependent upon the insufficiency of both filter-bed and filter-screen.

14. The combination of a heater, a plurality of oppositely disposed filtering elements;

an intermediate water supply and a by-pass leading from the water supply about one of the filtering elements.

15. A heater, a plurality of filters and a by-pass, and means by which each filter and the by-pass are automatically and consecutively brought into operation dependent upon the water level.

16. A heater, a plurality of filters and a by-pass, and means by which each is automatically and serially brought into operation dependent upon the insufficiency of its predecessor.

Signed at Philadelphia in the county of Philadelphia and State of Pennsylvania this 27th day of September A. D. 1906.

JOSEPH WILLARD GAMBLE.

Witnesses:
JOSEPH M. HEWLETT,
DAVID J. HUNTER, Jr.